US006739478B2

(12) United States Patent
Bach et al.

(10) Patent No.: US 6,739,478 B2
(45) Date of Patent: May 25, 2004

(54) PRECISION FLUID DISPENSING SYSTEM

(75) Inventors: David T. Bach, Ellicott City, MD (US); Muniswamappa Anjanappa, Ellicot City, MD (US); Gayathri S. Ragavan, Baltimore, MD (US); Tao Song, Baltimore, MD (US)

(73) Assignee: Scientific Products & Systems LLC, Ellicott City, MD (US)

(*) Notice: Subject to any disclaimer, the term of this patent is extended or adjusted under 35 U.S.C. 154(b) by 141 days.

(21) Appl. No.: 10/180,710

(22) Filed: Jun. 25, 2002

(65) Prior Publication Data

US 2003/0000965 A1 Jan. 2, 2003

Related U.S. Application Data

(60) Provisional application No. 60/302,450, filed on Jun. 29, 2001, and provisional application No. 60/357,884, filed on Feb. 19, 2002.

(51) Int. Cl.[7] .................................................. G01F 11/06

(52) U.S. Cl. ........................ 222/1; 222/136; 222/144.5; 222/309; 222/333

(58) Field of Search ................................ 417/442, 485, 417/490, 493, 498, 500; 222/1, 136, 144.5, 309, 333

(56) References Cited

U.S. PATENT DOCUMENTS

| | | | | | |
|---|---|---|---|---|---|
| 2,774,364 | A | * | 12/1956 | Brobeil | 222/136 |
| 4,275,823 | A | * | 6/1981 | Credle, Jr. | 222/136 |
| 5,060,825 | A | * | 10/1991 | Palmer et al. | 222/136 |
| 5,199,604 | A | * | 4/1993 | Palmer et al. | 222/144.5 |
| 5,388,725 | A | * | 2/1995 | Lichfield | 222/136 |
| 5,762,098 | A | * | 6/1998 | Manzone et al. | 222/135 |
| 6,269,978 | B1 | * | 8/2001 | Sindoni | 222/144.5 |

* cited by examiner

*Primary Examiner*—Kenneth Bomberg
(74) *Attorney, Agent, or Firm*—Clifford Kraft

(57) ABSTRACT

A precision fluid dispensing system containing at least one two-piece pump and a precision closed loop controller drive system to address the small volume precision dispensing requirements of bioscience applications. A multiple diameter pump can be combined with a pump having multiple inlet and outlet ports to allow for precision multiple outlet dispenses in a single pump that finds use with microtiter plate pipetting and other precision dispensing. Inlet ports can be located on the smaller diameter of the cylinder with outlet ports on the larger diameter of the cylinder. A microcontroller with closed loop feedback provides exact linear positioning and motion of the pump piston as well as optional control of a nozzle to provide exact micro-dispensing of fluids.

20 Claims, 10 Drawing Sheets

PRECISION FLUID DISPENSING SYSTEM

This application is related to U.S. provisional patent applications 60/302,450 filed Jun. 29, 2001 and 60/357,884 filed Feb. 19, 2002 and claims priority therefrom. These provisional applications are hereby incorporated by reference.

BACKGROUND

1. Field of Invention

The invention relates generally to the field of precision fluid dispensing for Bioscience applications and more particularly to a two-piece pump with a multiple diameter cylinder and piston and multiple inlet and outlet ports that can be controlled by a micro-controlled precision drive system capable of closed loop control.

2. Description of the Problem Solved

Syringe pumps that use glass syringes and pistons with seals are routinely used for fluid dispensing in the Biosciences. Independent valves are usually used to control fluid inlet and outlet functions. Currently, a syringe pump made by Cavro, Kloehn & Hamilton provides various syringe sizes for dispensing in the range of 1 microliter to 50 milliliter. Valve functions provide for multiple inlet and outlet ports. Although the syringe barrel plugs directly into the valve body, using seals, the valve can be essentially separate from the syringe. The syringe area and the piston linear displacement define the dispensed syringe fluid volume. In most cases, a stepper motor that is coupled to a lead screw to translate the rotary to linear motion controls the syringe piston displacement. The stepper motors in high end units often have shaft encoders so as to provide for drive overload detection for motor step loss.

The Cavro XL 3000, for example, with 8-port distribution valve, provides for a linear resolution of either 3000 or 24000 steps or increments in its 60 mm available piston travel. An optical encoded stepper motor also controls the valve stack port positioning. The valve stack can be directly or indirectly coupled to a second stepper motor shaft, and the syringe output end can be inserted into the bottom of the valve stack utilizing a seal.

The Hamilton Microlab 500 fluid diluters and dispensers are also precision fluid measuring instruments based on syringe technology. The Hamilton systems often use two syringe pumps to accomplish diluter functions. Sample dilutions are made by first filling one of the syringes with a programmed amount of diluent from a reservoir followed by aspirating a programmed amount of sample into the end of the dispensing tube using the second syringe. The last step to accomplish the dilution is to dispense the sample and diluent into a vial. Dispensing functions using a two syringe pump Hamilton unit are accomplished by filling one syringe with reagent 1 and the other with reagent 2. The two syringe pumps output the desired ratio into a common tube for vial filling. The syringe pumps are not known to provide reliability for long run cycles due to failure of the piston and cylinder seal and the seals that make up the valve stack. Also, cleaning of the system often requires the operator to completely disassemble the syringe cylinder and piston along with the rotary valve stack. This disables the entire dispensing system. In many applications, individuals completely flush out the dispenser with cleaning solutions rather than dismantle the system.

A simple two-piece pump is known in the art and is usually provided in either stainless steel or ceramic materials. This type of pump consists of a piston and cylinder in which the piston can also provide the valving functions. SPC France, NeoCeram and others manufacture two-piece pumps for the pharmaceutical industry, and recently two diameter pumps providing smaller volume dispensing capability have also appeared on the market.

NeoCeram and others have also built pumps that have multiple ports. The pump does not require moving seals between the piston and cylinder as close tolerances and a fluid provide the sealing function. The piston with a valve slot can be rotated between predetermined positions to select either inlet or outlet ports. When the correct inlet or outlet port has been selected, the linear motion provides for fluid aspiration or dispensing. In special cases, to recover pump fluid at the end of dispensing or for using cleaning fluids, inlet and outlet ports can be aligned. In nearly all cases the two-piece pumps have been designed and developed for high-speed fluid filling manufacturing lines. The drive hardware is expensive requiring precision ground ball screws along with motor encoders. The motor encoders can only detect the motion of the motor and not that of other elements in the drive train to the pump piston.

Syringe type positive displacement pumps are capable of dispensing very small fluid quantities but when the volumes drop below 3 microliters, getting the drop off the tube or nozzle requires contact or very near contact to the dispensing surface. Cartesian Technologies and others have provided active nozzles to simplify small volume delivery for the micro-array market. Cartesian Technologies uses a solenoid valve that is fluid coupled and synchronized to a syringe pump. Other systems use aerosol jet or piezoelectric devices coupled to syringe pumps to assist in small volume dispensing.

What is badly needed is a cost effective, small volume, easily cleanable, precision dispensing system for the Biosciences. A two-piece pump should utilize a piston and cylinder with at least two diameters, multiple inlet and outlet ports, and a precision pump drive system with cost effective electronics to meet these requirements. The pump drive needs to provide accurate dispensing with the position controlled by a linear measurement means. A controller can also provide capability for synchronization with active nozzles along with A/D capability to provide for external sensors to be read, such as a pressure transducer.

SUMMARY OF THE INVENTION

The present invention relates to a two-piece pump and a precision closed loop controller drive system to address the small volume precision dispensing requirements of the Bioscience market. The two-piece pump can contain a cylinder and piston with two different diameters to create a sealless pump with integrated valving. The pump cylinder and piston should have more than two diameters or the diameters can be tapered or curved. In a multiple diameter pump the amount of fluid dispensed is related to the difference of the diameter areas times the linear displacement of the piston.

The present invention, combines a multiple diameter pump with a pump having multiple inlet and outlet ports and with a precision control system. The configuration allows for precision multiple outlet dispenses in a single pump that can be used, for example, with microtiter plate pipetting. A positive displacement pump option for microtiter plate dispensing is the use of a pump with multiple inlet and outlet ports. The preferred position of inlet ports on the multi-diameter cylinder is on the smaller diameter part of the cylinder, while the preferred position of outlet ports is on the larger diameter of the cylinder. However, it should be noted that the ports could be located anywhere on the cylinder and still be within the scope of the present invention. The smaller diameter part of the cylinder is usually located at the lower portion of the cylinder relative to the larger diameter portion. The piston can have a groove on the smaller diameter part connected to a groove on the larger diameter part. The number of inlet and outlet ports is limited by the piston/cylinder diameter and the spacing between adjacent ports. If 5 mm were used as a minimum spacing between ports, and the pump has (10) 1 mm ports, where 8 ports are outlet and 2 ports are inlets, the necessary pump diameter would be just over 19 mm in diameter. For 19 mm diameter pump to dispense in the microliter range, the difference in the diameters should be small and the linear drive capable of very small displacements.

One of the preferred pump configurations of the present invention uses a two-diameter, multiple port pump with 2 inlet ports and 8 outlet ports. The pump is also capable of mixing because it can aspirate fluid into the pump from port 1, and then from port 2, followed by rotating the piston to accomplish annular mixing. The piston groove assists in the mixing, but the pump can have other features to assist in mixing as long as none of these features trap air during operation.

For recovery of dispensing fluid, the pump system could use 9 (or any odd number) of outlet ports where the 9th port is aligned with one of the inlet ports. This outlet port could be connected to the fluid supply or other container for recovery. In this configuration, the aligned inlet port could be connected to an air supply which could force remaining fluid out of the aligned outlet port. In another configuration, the aligned inlet and outlet port could be connected to a cleaning or flush solution. The piston could be cleaned by fluid pressure at the inlet port, and the piston could be rotated to clean to clean the fluid boundary layer between the piston and the cylinder. An alternate manufacturing method could be to have the same number of inlet and outlet ports and to plug unused ports in custom configurations.

The precision pump drive can contain at least one stepper motor or DC motor to control the linear motion of the pump piston, and usually another stepper motor or DC motor to control the rotation of the piston. This allows one of the pump's inlet or outlet ports to be aligned with the piston groove. The linear motion of the piston is generally created by the first stepper motor turning a ball screw. The ball screw nut, if held from rotating will move in a linearly fashion creating the necessary linear motion for the piston. A linear displacement sensor can monitor the position of the piston very accurately, and the entire system can be driven by a closed loop by a micro-controller. The preferred linear sensor for this application is a Renishaw 0.5 micron optical scale or similar scale including magnetic linear scales or linear voltage differential transformers (LVDT). The preferred stepper motors are 5 phase Oriental Nanostepper for the linear motion and 5 phase half step motors for the rotary motion. The Nanostepper motor, as supplied, has (16) discrete resolution ranges from 500 steps per revolution to 125000. These ranges are operator selectable. The use of a nanostepper allows the drive to have an adequate number of steps between the 0.5-micron Renishaw lines. For a THK 4 mm pitch ball screw it would require over 15 steps for the advance of the 0.5 pitch. The resolution can be selectable between inlet and outlet functions. It should be noted that other suitable stepper or DC motors can be used.

As an example, the pump can aspirate fluid into an inlet port at 10,000 steps per revolution and then dispense through an outlet port at 125,000 steps per revolution. Because of the stopped motion stability, simplicity to control and maintain accuracy, the preferred system contains stepping motors. It is also within the scope of the present invention for the linear drive to be a linear motor such as the stepper or DC BALDOR Electric Co. motor or the Nanomotion motor from Nanomotion, Inc.

The pump system can be run orientated in various positions including horizontal and vertical as long as the position allows for air free dispensing. A micro-controller or digital signal processor is preferred to control the rotary and linear positioning. By entering information into the controller as to the desired amount of fluid to dispense, very precise dispensing can be accomplished because the entire resolution of the system is derived from the linear encoder. The movement of the piston can be controlled by several motion velocity profiles including the use of a Gaussian profile for smoothness of motion. To effectively dispense very small volumes, the controller can optionally interface with active nozzles. This interface, when used, can provide for synchronization of the piston functions with that of the active nozzle. The addition of optional analog to digital conversion (A/D) capability lets the system interface with external sources, such as a pressure transducer or other source.

DETAILED DESCRIPTION

Figure 1:
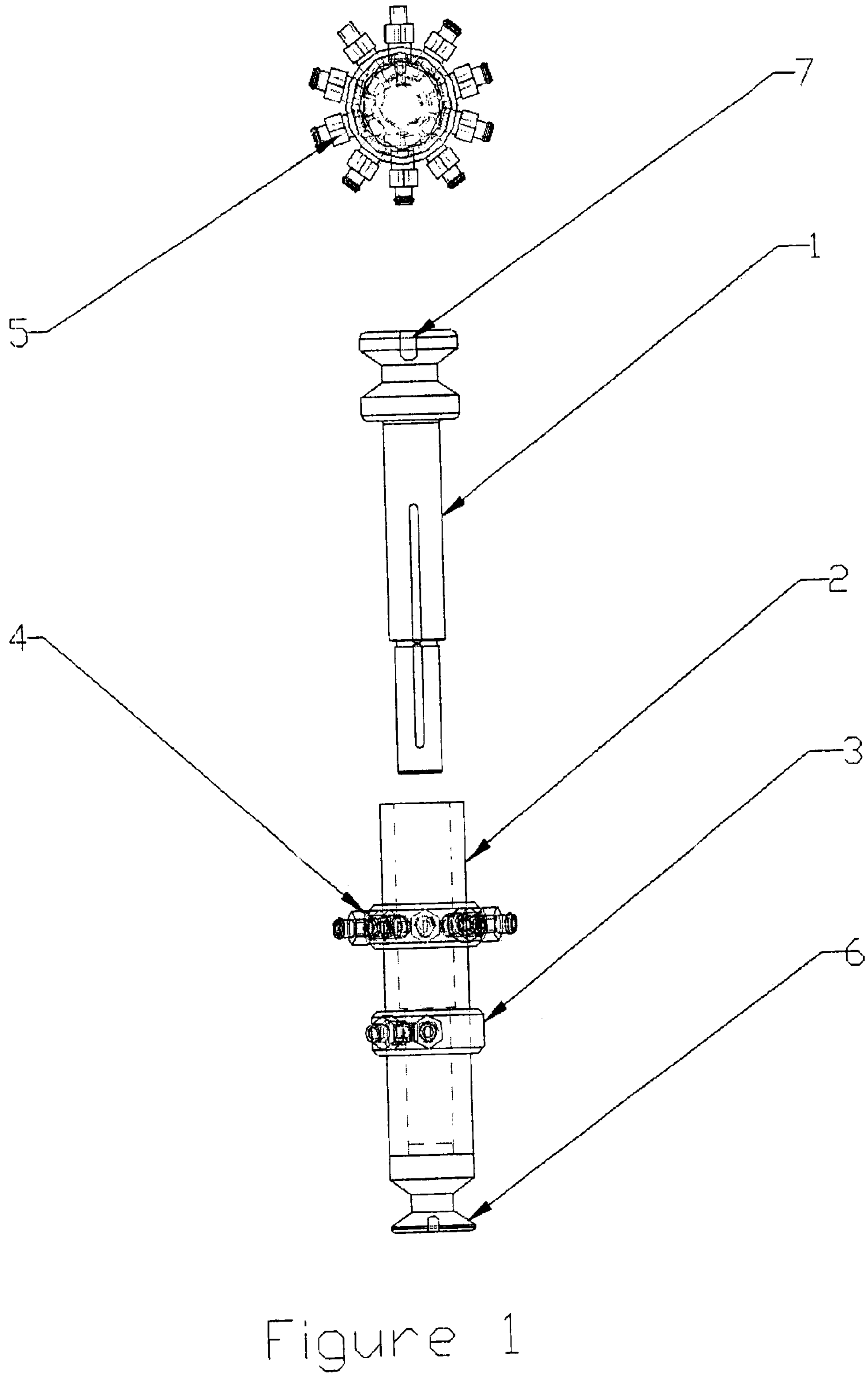
FIG. 1 shows a multiple diameter multiple port two-piece pump.

FIG. 1 shows a two diameter multiple port two-piece pump. It consists of a piston 1 and a cylinder 2. The piston is connected to a drive system using a keyed connector and a piston key, shown as 7. The lower connector 6, can also be keyed and fixed to the base of the drive assembly. A controller and position sensing sensors determine the piston rotary and linear positioning, relative to the fixed cylinder. The piston outside diameter, and the cylinder internal diameter, have a very small clearance creating a fluid boundary layer seal. At a certain position along the cylinder are located inlet ports 3 and outlet ports 4. There are various tube fittings 5 available that simply screw into the inlet and outlet fitting rings.

Figure 2:
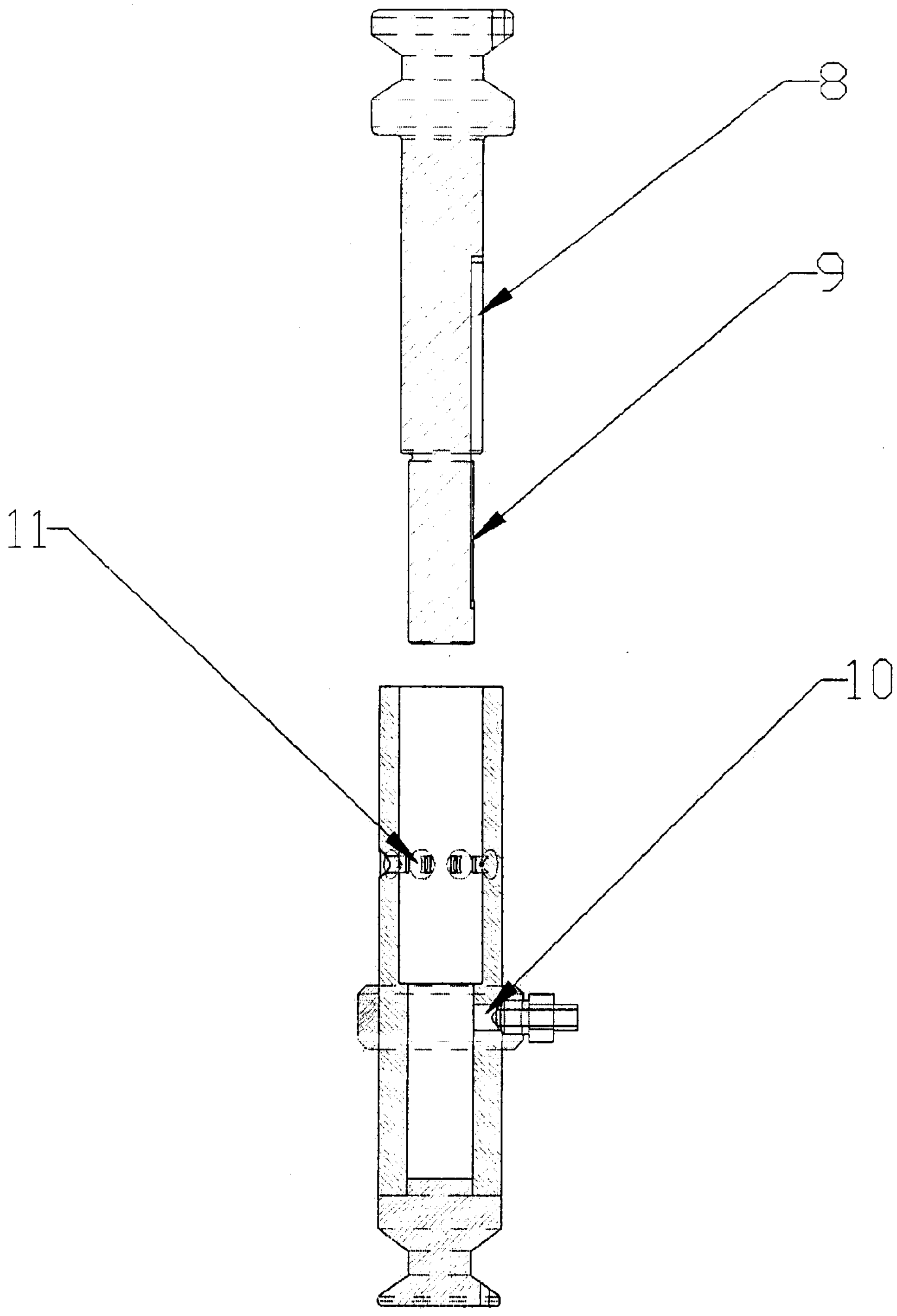
FIG. 2 shows a cross section of a multiple diameter multiple port two-piece pump.

FIG. 2 shows how the fittings 10 are used to seal to the cylinder inlet/outlet ports. The inlet outlet ports 11 are shown as rectangular slots on the internal diameter of the cylinder and circular on the outside diameter where the fittings create seals. The port slots can also be circular holes. The piston can contain a groove on the larger diameter 8 and on the smaller diameter 9. Between the two diameters, an undercut can assist in pump manufacturing and act as the means to connect 8 and 9. In FIG. 2, the groove is shown aligned on the two diameters, but the groove orientation can be rotated to each other as long as the undercut provides a continuous fluid path between 6 and 9. The grooves may also be different sizes.

Figure 3:
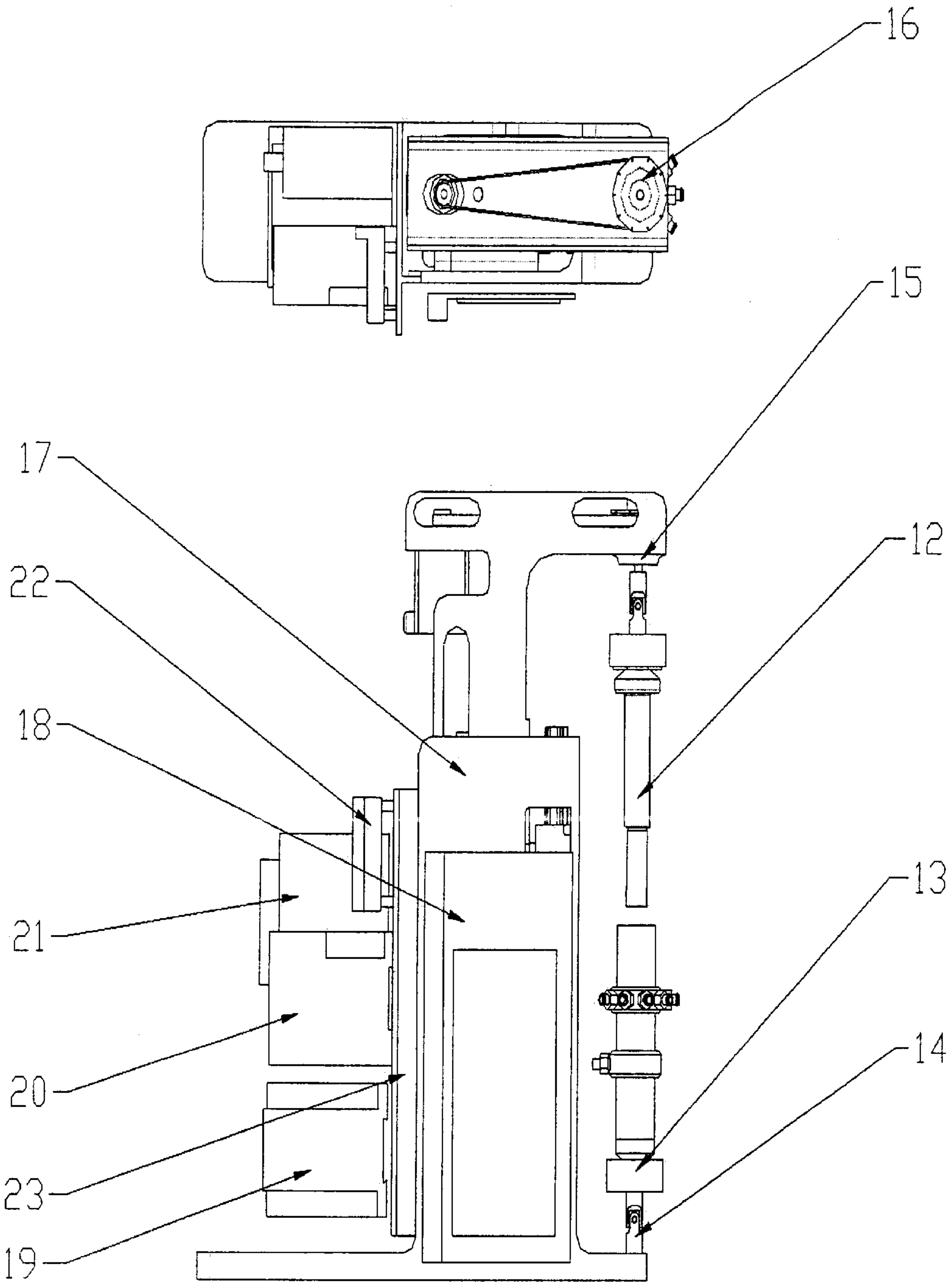
FIG. 3 shows an embodiment of a precision pump drive frame and electrical components.
Figure 4:
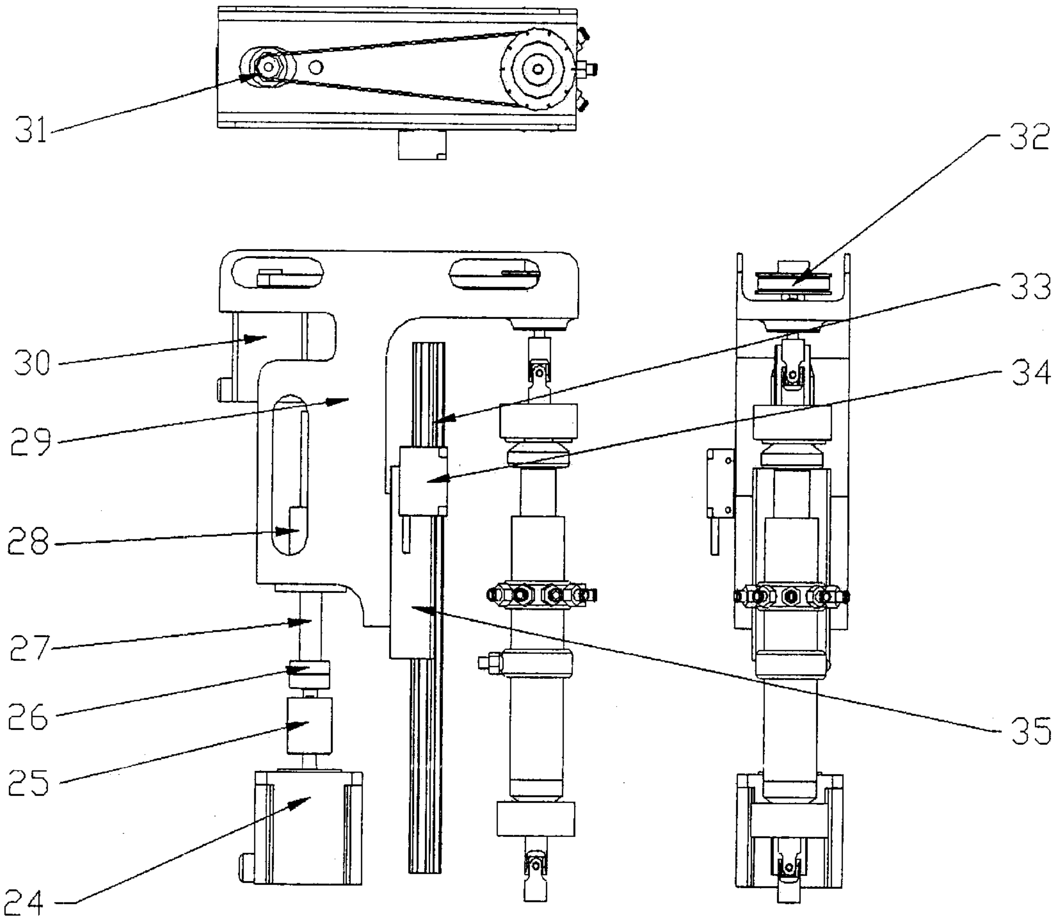
FIG. 4 shows slide and optical encoder components.

FIGS. 3 and 4 show the pump and drive system overall components. The pump piston 12 and the cylinder can be coupled to the drive with keyed connectors 13. There are numerous connection devices that could be used here and are within the scope of the invention. The connectors could be linked to universal joints 14 to keep the piston and cylinder aligned and free from any bending loads during use. The bottom universal joint can be connected to the base frame, while the upper, or piston universal joint can be connected to a rod held in place by two angular contact bearings 15. These preloaded bearings can provide for piston rotation, but not for linear motion. A pulley can be mounted at the top end of the bearing shaft. The pulley, its associated belt 32 and a motor pulley 31 can provide a means for coupling the rotary stepper motor 30 to the piston.

The pulley can have inlet and outlet alignment notches so that an optical switch can sense rotary position. On a lower pulley flange is usually at least one notch that represents a home position for the rotary drive. The movable upper support 29 can provide for the rotary bearing mounting, rotary drive components and a mounting surface for the linear ball screw nut 28. A movable upper support 29 can be coupled to the linear ball guide 35. The figures show the upper support shifted relative to the ball guide 35 so that the piston can be seen outside of the cylinder. Normally these two surfaces are aligned, and the upper support fastened to the ball slide carriage using mechanical fasteners. Shown attached to the carriage are upper and lower limit magnetic switches, a home magnetic switch and an optical scale. The Renishaw optical head 34 can be fixed to the frame where it can sense the position of the ball guide carriage. A ball guide rail 33 is shown attached to the base frame. An upper support 29 can be moved up and down by sliding on a linear guide rail assembly 33,35 as a result of the linear ball screw 27 rotations. A ball screw nut 28, attached to the upper support 29, provides the conversion of ball screw rotary motion to linear movement up or down. Force support, and elimination of axial motion, can be provided by a second set of angular contact bearings 26. The ball screw can be coupled to a stepper motor 24 with a shaft coupling 25.

FIG. 3 shows a possible position where the controller 18 can mount to the frame 17. A plate 23 is where rotary driver 22, nanostepper drive 21, and five and twenty four volt (or any other voltage) power supplies 19, 20 can be mounted.

FIGS. 5–12 show details of a particular embodiment of a microcontroller system. It should be remembered that many other embodiments are within the scope of the present invention. This preferred embodiment is illustrated and described to teach the techniques and methods used in the invention.

A controller executes control sequences by using ultra high precision closed loop control of the linear position of the piston relative to the cylinder. The piston has two types of motion relative to the cylinder: linear and rotational. The linear motion can be generated by commanding a nanostepper motor or other accurate motor with real time feedback from an ultra high precision position sensor. A preferred linear sensor is an Renishaw optical scale with a resolution of 0.5 micrometer. Commanding a second stepper motor with feedback from two binary sensors generates, or open loop, causes the rotational motion of the piston relative to the cylinder. The control system can monitor the binary sensors to confirm the engagement of the specific input and output ports. Precision alignment of the slot on the piston with the appropriate port on the cylinder is critical for efficient operation of the pump. Therefore, the rotational control must be accurate enough to achieve correct alignment.

Figure 5:
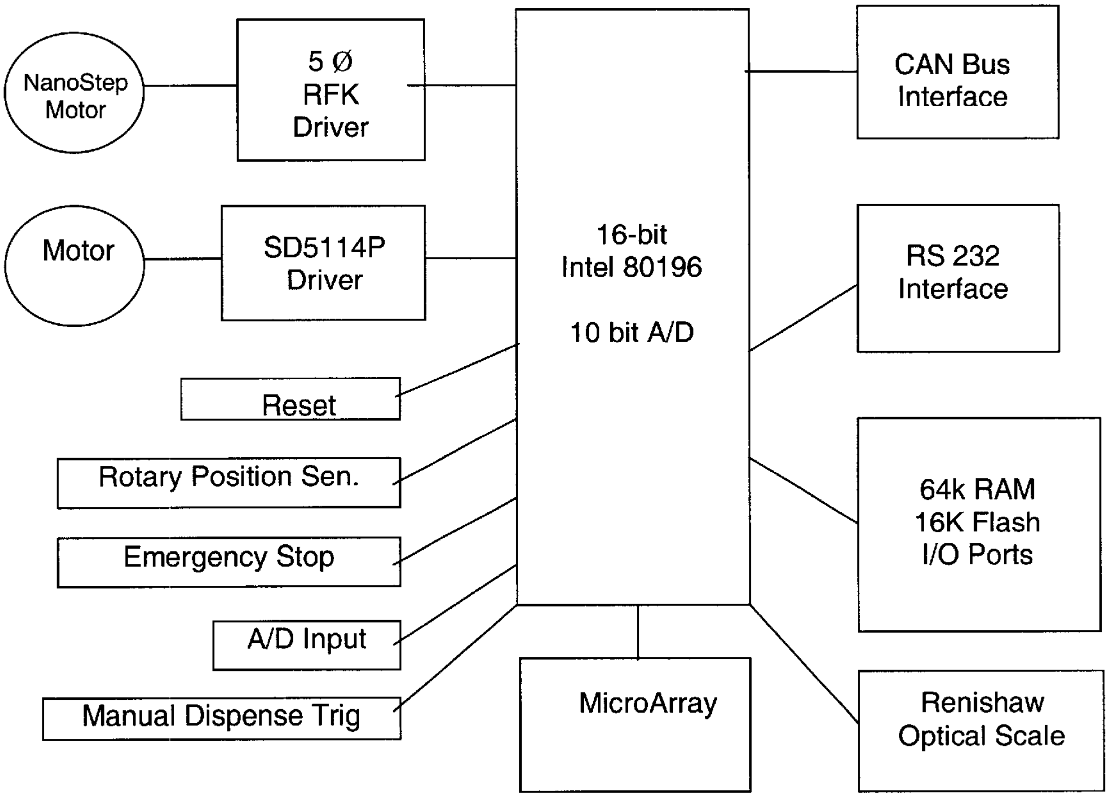
FIG. 5 shows a possible controller system architecture.

The preferred controller uses an Intel 80C196 microcontroller. FIG. 5 shows the block diagram of the architecture of the chip-based controller system. This system can contain a 16 bit microcontroller (or other sufficient bus width) with a 10 bit or more A/D converter. A PSD4135G2 flash memory or other memory can be used to store the program and data. A RAM memory can optionally be battery backed. A JTAG port can be used to load and modify the program.

The preferred system has two or more motor control outputs. One is to a nanostep driver 50RFK for linear motion and the other is to a SD5114 driver for rotary motion of the piston relative to the cylinder. To control multi-port nozzle, the controller has an 8 digital output (expandable to 12 port). There can be four analog input channels, one of which can optionally be used to monitor the pressure of the fluid.

The micro-controller also has an RS232 and CAN bus interface. Through the RS232 serial interface, a user can control the pump with a personal computer (PC). Another communication interface can be a CAN bus with which several pumps can be controlled via a network. Other functions of the system include Reset, emergency stop, manual dispense triggering, etc. For future applications, the system also has 4 channel digital input and 8 channel digital output which can be used to expand nozzle control, LED display, etc.

Figure 6:
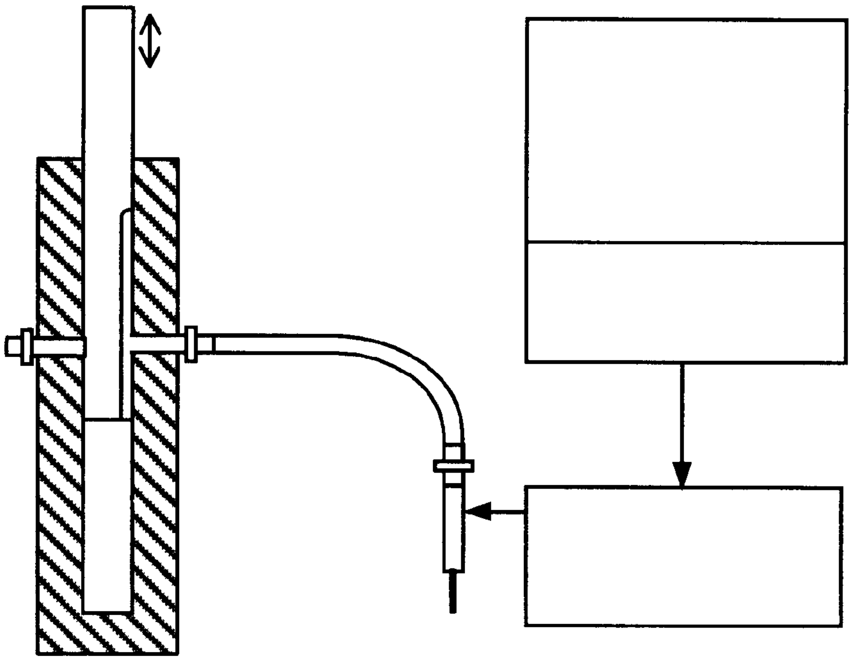
FIG. 6 shows an interface between an active nozzle and a controller.

To use present invention for precision low-volume array dispensing, use of active nozzle is required. Since the volume can be less than microliter, dispensing through traditional tubes connected to the output port of unit is difficult at best. With such small volumes, the gravitational forces become negligible while the surface tension becomes dominant. A unit with an integrated active nozzle is as shown in FIG. 6. The active nozzle acts as a secondary actuator to squeeze the fluid out of the output tube. The microarray interface provided on the controller can interface with the active nozzle driver. A command to move the piston can be synchronized to activate the nozzle resulting in micro drops.

Figure 7:
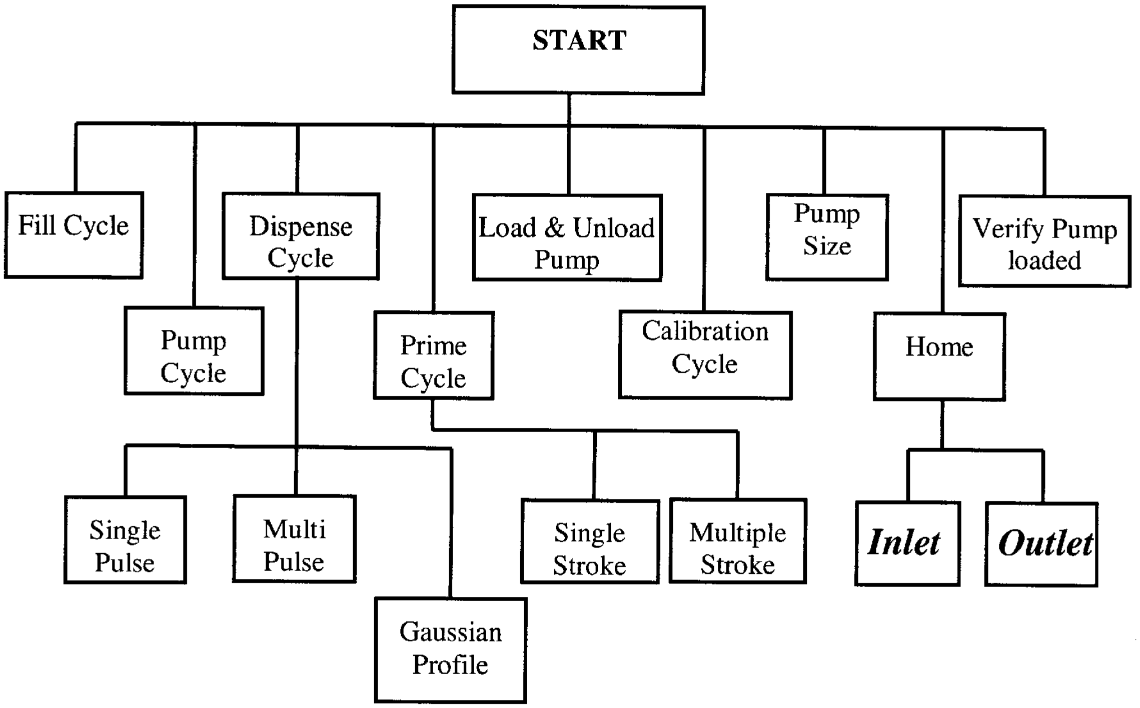
FIG. 7 shows a supervisory control sequence.

FIG. 7 shows a possible supervisory control algorithm. When the unit is switched on, the user has the option of choosing one of nine functions. With such a system architecture, new functions can easily be added without changing the hardware.

The functions will now be described.

Figure 8:
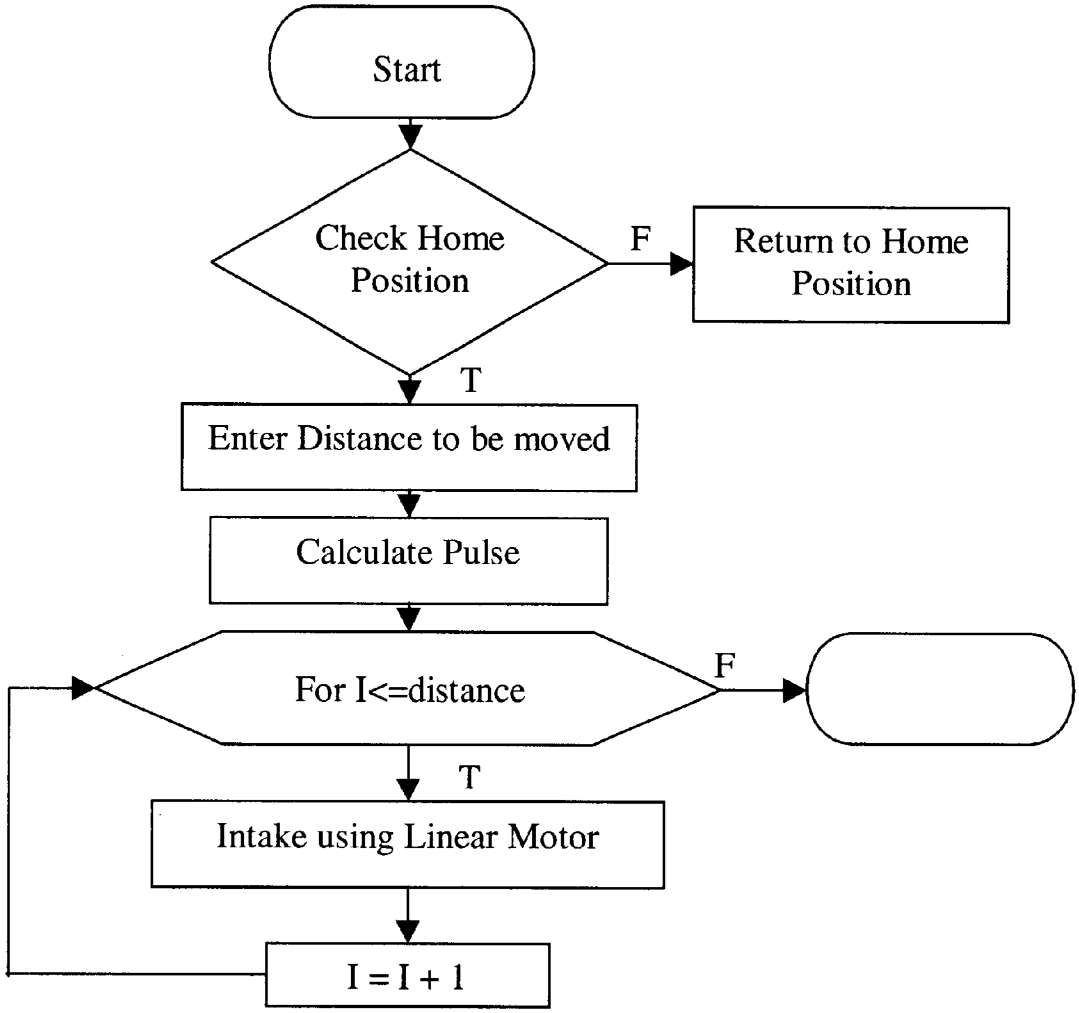
FIG. 8 shows a single pulse dispensing cycle.

Fill Cycle: When this function is evoked, the piston first rotates to a predefined port followed by a linear motion where the pump goes to its home position (bottom most position of the piston relative to the cylinder). The piston is then rotated to align with the input port, and begins moving upward to a preselected distance or to its full stroke. It stops when the pump is completely filled with the preselected volume of fluid. FIG. 8 shows the flow chart of a fill cycle.

Pump Cycle: This function normally begins after the fill cycle. When chosen, the piston rotates to align its slot with the appropriate output port if it is not already in that position, and then moves downward until it reaches its home position thereby dispensing the full capacity of the pump; it then stops.

Figure 9:
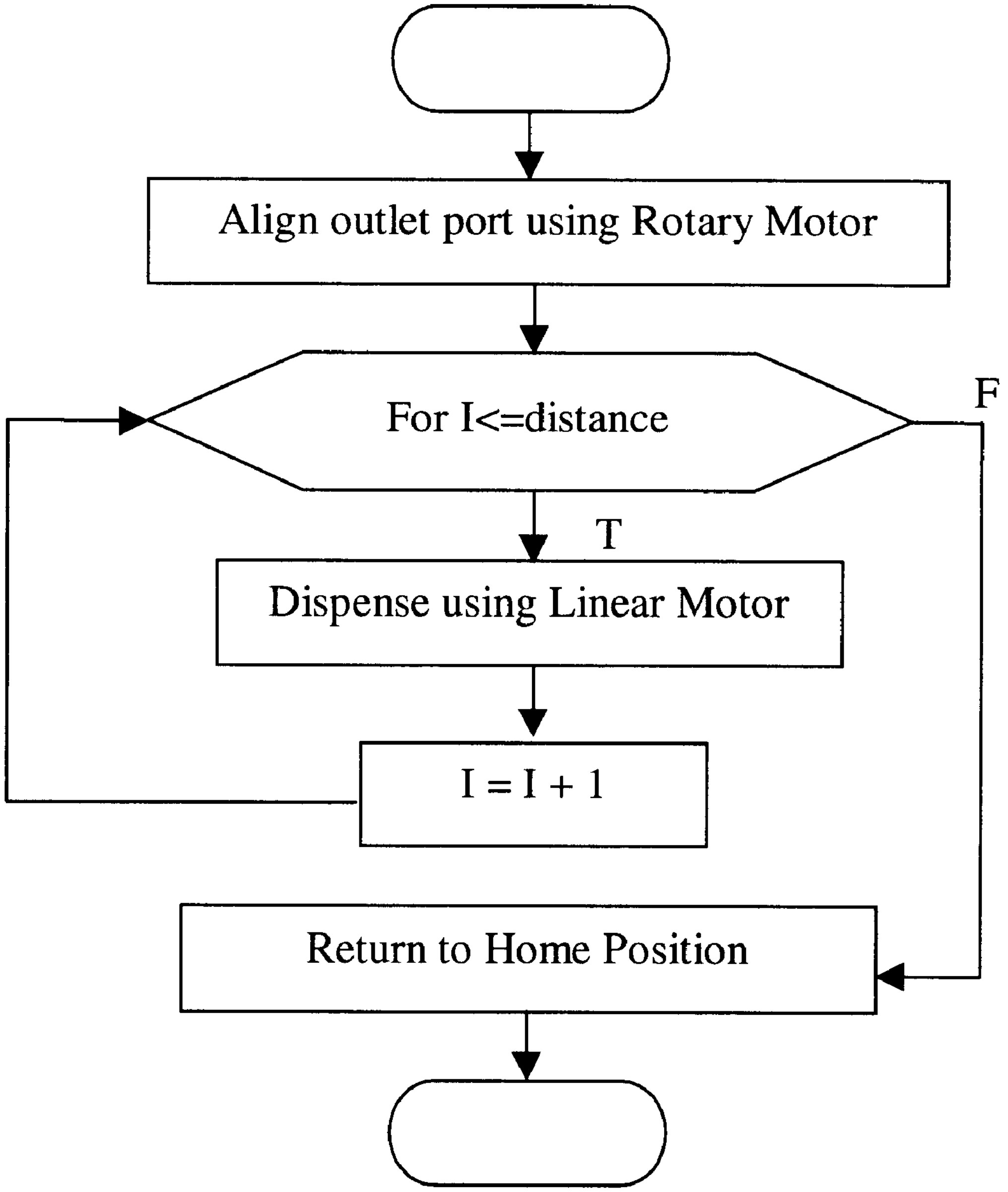
FIG. 9 is a flowchart of a dispensing cycle.

Dispense Cycle: This function is different from the pump cycle. In this cycle, the user has the option to select any quantity of fluid that must be dispensed as long as it is less than its maximum capacity. The controller begins by rotating the piston to align its slot to the appropriate output port if it is not already there. The piston is then commanded to move downward in one of two modes: single Pulse or multiple pulse. In single pulse, the piston moves down by one motor step dispensing the smallest volume possible with the system. In multiple pulses, the nanostep motor is commanded to move by a preselected number of pulses. The dispense cycle is shown in FIG. 9.

Prime Cycle: In this function the pump is commanded to home position followed by fill cycle and pump cycle in succession. The prime cycle can be either single or multiple depending upon the fluid properties of the fluid that is being handled.

Load and Unload Pump: The user can invoke this function to change the pump. This requires first unloading the existing pump and then loading the new pump followed by a pump size algorithm. The unloading command usually initiates moving to align with a desired port with the pump moving to its home position, and displaying a signal indicating it has reached its unloading position. Similarly, the loading the pump algorithm moves the pump to its loading position.

Calibration Cycle: The calibration cycle gives the feature of updating the calibration of the pump. This is usually required every time the pump is changed. The cycle begins with home position, fill cycle, and dispense cycle. The output from the port can be weighed or otherwise sized (for example by optical means) to update the calibration table.

Pump Size: This function is used when a new pump has to be installed on the units. A database of all available pumps will be available from which the user selects the pump of his/her choice. The program then calculates all the relationships between the stroke length and the volume and makes that as its current database.

Home: The home position is achieved by sensing both the rotation and linear home signals. The location of the rotary home can be found using two binary sensors. These can be optical sensors that indicate when the piston has rotated so that its slot is aligned with an input port. The optional slots in the pully can act as the means to align the slot of the piston to the desired port. The linear motor home is achieved by monitoring a linear scale pulse that can be generated when the piston moves relative its bottom most position. The optical sensor output signal includes home pulse output.

Verify pump loaded: This function confirms the proper loading of the pump. A binary switch at the interface between the piston and the universal joint can be used to sense the presence of the pump. The controller forbids any motion of the piston until this becomes true.

Most of the controller's functions have a task of moving the piston relative to the spindle along their axis. The accuracy of this motion dictates the overall accuracy of the pump. One unique feature of this low-cost ultra high precision pump is that these linear motions are made precise by using a real time closed loop control of the piston relative to the cylinder. Furthermore, a Gaussian speed profile can be used to eliminate unwanted impact motion and avoid missed steps.

Figure 10:
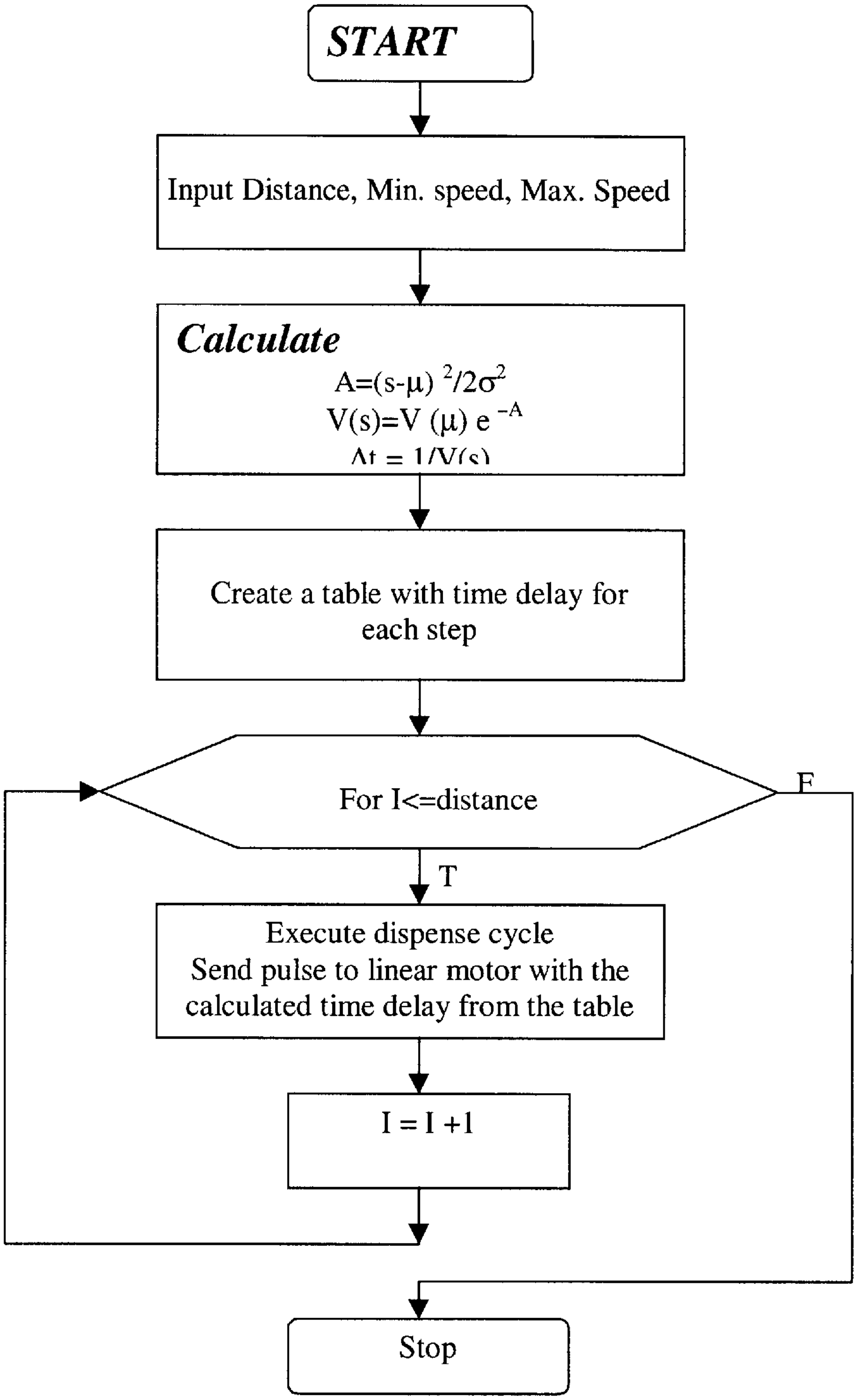
FIG. 10 shows a Gaussian motion algorithm.

When moving the piston for filling, dispensing, priming, etc., it is desirable to have a speed profile so that jerks can be avoided during starting and stopping. Sudden motions of the piston relative the cylinder, in addition to creating undesirable jerks, have a tendency to increase the work load on error compensation. Therefore to achieve a smooth motion, a Gaussian speed profile can be chosen. The linear motion of the piston relative to the cylinder used in all the functions discussed so far can be achieved by using a Gaussian profile for speed. FIG. 10 shows the flowchart of a Gaussian algorithm that can be used for the linear motion. Once the distance to be moved is input by the user, a Gaussian speed table is generated. A speed versus distance profile is created for the required distance to be moved. The speed of the nanostepper motor can be changed by changing the time delay, hence the pulse width. The time delay can be calculated by finding the inverse of the calculated speed and be tabulated for the respective step. Then the single or multiple dispense cycle can be called with the Gaussian profile incorporated. This is shown in FIG. 10.

One unique feature of the present invention is the integration of a real-time closed loop position control of the linear motion of the piston relative to the cylinder. In operation, once the user selects the distance the piston must move, the controller first generates a speed table to fit a Gaussian profile as explained before. Following this table, the controller commands the nanostepper motor to raise or lower the piston and start monitoring the position of the piston. The position of the piston relative to the cylinder can be obtained by measuring the relative motion between the rail and carriage. The position sensor, an optical sensor in this embodiment, outputs digital quadrature signals that are fed to two high speed digital input (HSI) channels of the controller. The total number of transitions on two quadrature channels is proportional to the distance traversed by the piston relative to the cylinder.

There are at least two possible control algorithms, multiple pulse and single pulse, which are used in each of the linear motion. First, a multiple pulse motion can be initiated using a multiple pulse motion algorithm. In this algorithm, the nanostepper is commanded through high-speed output (HSO) channel to go up to a predetermined distance (a large part of the stroke in this embodiment) following the Gaussian table for speed control. At the same time, the quadrature pulses output from the sensor are counted to keep track of the actual position moved.

Once the multiple pulse motion is complete, the controller can initiate the single pulse algorithm. First the error in position, if any, is calculated. Then the actual position can be calculated using the counter values stored and compared with the expected position of the piston relative the cylinder. If the motor missed any pulse commands due to overload, overspeed, or for any other reason, the error will be non-zero. Once the error is known, the controller will start sending out single pulse commands to the nanostepper and verify the motion for each pulse. In other words, the motion can be controlled by checking the motion associated with each step in real-time. This method can slow down the speed, but this is not too important because it occurs in the Gaussian region where the speed is very low in preparation to stopping the motion. Furthermore this region is very small compared to the total motion of the piston. The two-stage algorithm enables optimum balance between the need for ultra-high precision real-time control and overall dispensing speed.

The rotary position can be determined using two binary optical sensors and two circular disks with slots. The top and bottom side of the rotary pulley can serve as the two circular disks. The top portion of the pulley can have a single slot cut, while the bottom portion of the pulley can have ten slots (or other number) corresponding to ten ports in the cylinder or vice versa. The number of slots depends on the number of input and output ports of the pump. The slots are cut in such a way that the bottom ten slots are spaced equally, and one of the slots matches with the top slot. In this embodiment, there are two optical sensors used to sense these slots. They are positioned in such a way that the top rotary sensor sees the slot in the top portion of the pulley while the bottom sensor sees the ten slots in the bottom portion of the pulley. The home and port positions can also be reversed.

When both the sensor outputs are reading a high (or low depending on the circuit configuration), both top and bottom slots are aligned to form the home position. At all other times, the top sensor gives a low output while the bottom sensor alternates between low and high depending on whether the ports are in position or not.

To use invention in yet another scenario of custom dispensing fluid into a container, a hand held dispensing device is usually required. This device can be equipped with a trigger mechanism that will initiate the motion of the piston in units. The user selects the volume to be dispensed in advance, then positions the device at the desired location and presses the trigger that initiates the pumping action on the unit.

It should be noted that the present invention has been explained by various descriptions and illustrations. It should be understood that there are many changes and variations that are within the scope of the present invention. The scope of the present invention flows from the claims and not the descriptions, figures or described embodiments.

We claim:

1. A precision fluid dispensing system comprising:

a two-piece pump having a two or more diameter piston disposed in an outer cylinder, said outer cylinder having a same number of diameters as said piston, said pump also having a plurality of input and output ports attached to said outer cylinder and defined by said piston and said cylinder;

a fixed frame attached to said outer cylinder, said fixed frame rigidly holding said outer cylinder;

a sliding frame attached to said piston, said sliding frame moving in relation to said fixed frame, said sliding frame displacing said piston by said movement;

a first motor attached to said sliding frame, said first motor coupled to said piston causing said piston to rotate between a plurality of port positions;

a second motor attached to said fixed frame, said second motor causing said sliding frame to move in relation to said fixed frame, whereby said sliding frame displaces said piston;

a closed loop feedback control system with an input and an output, said input proportional to said piston's position, said output controlling said second motor, whereby said closed loop feedback control system allows displacement of said piston to precisely dispense a predetermined amount of fluid.

2. The precision fluid dispensing system of claim 1 wherein said two or more diameter piston and cylinder have a smaller and a larger diameter, said inlet ports being located on said smaller diameter.

3. The precision fluid dispensing system of claim 2 wherein said outlet ports are located on said larger diameter.

4. The precision fluid dispensing system of claim 1 wherein said first and second motors are stepper motors.

5. The precision fluid dispensing system of claim 1 wherein only one of said ports is active at a given time.

6. The precision fluid dispensing system of claim 1 wherein at least one input port and at least one outlet port are aligned.

7. The precision fluid dispensing system of claim 1 further comprising a linear scale responsive to the position of said piston, said linear scale providing input to said closed feedback control system.

8. The precision fluid dispensing system of claim 4 wherein said second stepper motor can step at least 125,000 steps per revolution.

9. The precision fluid dispensing system of claim 1 wherein said two piece pump contains an output port coupled to a controllable nozzle.

10. The precision fluid dispensing system of claim 9 wherein said controllable nozzle is directly controlled by said closed loop feedback system.

11. A method of dispensing a predetermined amount of fluid comprising the steps of:

specifying to a closed loop feedback control system a desired amount of fluid to dispense, said closed loop feedback control system coupled to a sliding piston in a two piece pump, said piston rotating between a plurality of inlet and outlet port positions and moving linearly out and in to load and dispense fluid, said closed loop feedback system sensing said piston's linear position and controlling said displacement;

causing said piston to rotate to a predetermined inlet port position;

causing said piston to move linearly out thereby loading fluid;

causing said piston to rotate to a predetermined outlet port position;

causing said piston to move linearly in under direct control of said closed loop feedback system thereby dispensing a precise amount of said fluid.

12. The method of claim 11 further comprising high precision position feedback control achieved in two stages.

13. The method of claim 11 wherein said piston is driven by at least one stepper motor.

14. The method of claim 13 wherein said stepper motor can step at least 125,000 steps per revolution.

15. The method of claim 11 wherein said two piece pump is coupled to a controllable nozzle.

16. A system of the type used in biological sciences to dispense precision micro-quantities of fluids, the system comprising, in combination:

a two piece pump means with an outer cylinder containing a plurality of ports with ports and a rotating and sliding inner piston for dispensing fluids;

a processor means for providing closed loop feedback control to said piston, said piston rotatable between port positions and displacable linearly, said processor means controlling a rotational and displacement position of said piston;

linear displacement measurement means for determining the displacement of said piston, said displacement being communicated to said processor means;

motor drive means for causing a linear displacement of said piston, said motor drive means being controlled by said processor means to precisely dispense a predetermined amount of fluid.

17. The system of claim 16 wherein said motor drive means is a stepper motor.

18. The system of claim 17 wherein said stepper motor can step at least 125,000 steps per revolution.

19. The system of claim 16 wherein said stepper motor can step between 500 and 155,000 steps per revolution.

20. The system of claim 16 wherein said two piece pump means is attached to a controllable nozzle.

* * * * *